United States Patent
Zhang et al.

(10) Patent No.: US 7,615,946 B2
(45) Date of Patent: Nov. 10, 2009

(54) FAN SPEED CONTROL DEVICE

(75) Inventors: Jie-guang Zhang, Anhui Province (CN); Shih-Hao Liu, Taipei (TW)

(73) Assignee: Inventec Corporation, Taipei (TW)

( * ) Notice: Subject to any disclaimer, the term of this patent is extended or adjusted under 35 U.S.C. 154(b) by 146 days.

(21) Appl. No.: 12/015,928

(22) Filed: Jan. 17, 2008

(65) Prior Publication Data

US 2009/0116823 A1     May 7, 2009

(30) Foreign Application Priority Data

Nov. 2, 2007     (TW) .............................. 96141566 A

(51) Int. Cl.
H02P 7/00     (2006.01)
(52) U.S. Cl. ..................................... 318/268
(58) Field of Classification Search ................ 318/268; 388/804, 811
See application file for complete search history.

(56) References Cited

U.S. PATENT DOCUMENTS

| | | | |
|---|---|---|---|
| 6,545,438 B1 * | 4/2003 | Mays, II | 318/400.01 |
| 6,650,074 B1 * | 11/2003 | Vyssotski et al. | 318/400.12 |
| 7,218,073 B2 * | 5/2007 | Huang et al. | 318/599 |
| 7,233,121 B2 * | 6/2007 | Wu et al. | 318/400.17 |
| 7,545,112 B2 * | 6/2009 | Wu et al. | 318/592 |

* cited by examiner

*Primary Examiner*—Bentsu Ro
*Assistant Examiner*—Thai Dinh
(74) *Attorney, Agent, or Firm*—J.C. Patents

(57) ABSTRACT

A fan speed control device includes a management selection module, a first and a second buffers, a resistor, a transistor, and a switch. Depending upon whether a motherboard supports a system of a baseboard management control or not, the fan speed control device selectively uses an indicative signal of a serial input and output interface or an indicative signal of the baseboard management control to indicate a power-on status. At the power-on moment, the fan speed control device controls the fan to operate at its minimum speed, so that a system crash due to a power output shortage of a power supply can be avoided. As the system enters stable operation, the fan speed is controlled by a pulse width modulation signal.

5 Claims, 3 Drawing Sheets

FAN SPEED CONTROL DEVICE

CROSS-REFERENCE TO RELATED APPLICATION

This application claims the priority benefit of Taiwan application serial no. 96141566, filed on Nov. 2, 2007. The entirety of the above-mentioned patent application is hereby incorporated by reference herein and made a part of this specification.

BACKGROUND OF THE INVENTION

1. Field of the Invention

The present invention relates to a fan speed control device, and more particularly, to a control device controlling the fan to operate at a minimum speed when an apparatus equipped with the fan is being powered on.

2. Description of Related Art

Along with the technology development, notebook computers or desk-top computes, which are capable of providing various function, such as, word processing, webpage browsing, instant communication, and the like, have become one of indispensable tools in our lives. The computer generates heat when it operates. To prevent the heat from affecting the operating performance of the computer, a fan is usually mounted within a chassis or above a central processing unit of the computer to dissipating the heat.

The fan is conventionally designed according to a worst case, i.e., if operated at its maximum speed, the fan must have the capacity to maintain the temperature of an electronic device within a safe temperature range. FIG. 1 illustrates a partial circuit diagram of a conventional fan speed control device. Referring to FIG. 1, in recent years, a main control chip, also known as a baseboard management control 110, has been embedded in the baseboard by many manufacturers to manage the operation of a monitor system in the computer chassis. The baseboard management control 110 is electrically coupled to a number of sensors in the chassis to receive various sensed information including, voltage and temperature of the central processing unit, environment temperature, fan speed, and the like. Thus, the baseboard management control 110 controls the duty cycle of a pulse width modulation signal FAN_PWM, based on the sensed information, and thereby controls the speed of the fan 120.

In general, an external circuit of the baseboard management control 110 includes a buffer 130, and the buffer 130 is usually implemented as an open drain complementary metal-oxide semiconductor (CMOS). At the power-on moment of the computer, the baseboard management control 110 may have not been supplied with power yet or the pulse width modulation signal FAN_PWM may have not been enabled. In this case, an output of the buffer 130 may provide a signal having a logic high level (i.e., power source voltage Vcc) to control the fan 120 to operate at its maximum speed. Following a period after the computer power-on, the pulse width modulation signal FAN_PWM is enabled to control the speed of the fan 120 with its duty cycle.

However, a plurality of fans may be disposed within the computer chassis, and at the power-on moment, many elements in the computer may operate at their maximum speeds. If these fans operate at full speed at the power-on moment, a computer system crash is very likely to occur due to a transient power output shortage of the power supply.

SUMMARY OF THE INVENTION

The present invention provides a fan speed control device. The fan speed control device is able to control the fan to operate at its minimum speed at a power-on moment. As the system enters stable operation, the fan speed is controlled by a pulse width modulation signal. In addition, that the motherboard may support a different system has been fully considered in the fan speed control device that can selectively control the fan speed via a base board management control or a serial input and output interface.

A fan speed control device adapted for controlling a speed of a fan is illustrated. The fan speed control device generally includes a management selection module, a first and a second buffers, a resistor, a transistor, and a switch. The management selection module may selectively output an indicative signal, which is indicative of a power-on status, of a serial input and output interface or the baseboard management control, depending upon whether a motherboard supports a system of the baseboard management control or not. The first buffer has a first power source terminal and a second power source terminal respectively coupled to a first voltage and a second voltage, an input terminal receiving a pulse width modulation signal, and an output terminal generating a control signal to the fan. The resistor has a first end and a second end respectively coupled to the first power source terminal and the output terminal of the first buffer. The switch coupled to the management selection module determines to transmit the indicative signal to a control terminal of the transistor or a first terminal of the transistor according to a logic level of the indicative signal, wherein a second terminal of the transistor is coupled to the second voltage. The second buffer has a first power source terminal and a second power source terminal respectively coupled to the first voltage and the second voltage, and an input terminal and an output terminal respectively coupled to the first terminal of the transistor and the output terminal of the first buffer.

According to one embodiment of the present invention, the management selection module may output the indicative signal of the serial input and output interface if the motherboard does not support the system of the baseboard management control, and the management selection module may output the indicative signal of the baseboard management control if the motherboard supports the system of the baseboard management control.

According to one embodiment of the present invention, the switch may transmit the indicative signal to the control terminal of the transistor to conduct the transistor if the indicative signal has a high logic level, and the switch transmit the indicative signal to the first terminal of the transistor if the indicative signal has a low logic level.

In various embodiments of the fan speed control device, the management selection module is used to select the serial input and output interface or the baseboard management control to control the fan speed according to the support capacity of the motherboard. At the power-on moment, the indicative signal is transmitted to the control terminal of the transistor to conduct the transistor via the switch, or is transmitted to the first terminal of the transistor via the switch so that the voltage of the first terminal of the transistor is thereby controlled, and the fan speed is controlled via the output terminal of the second buffer. As the system enters stable operation, the fan speed is controlled by the pulse width modulation signal through the first buffer with.

In order to make the aforementioned and other features and advantages of the present invention more comprehensible, embodiments accompanied with figures are described in detail below.

DESCRIPTION OF THE EMBODIMENTS

Figure 1:
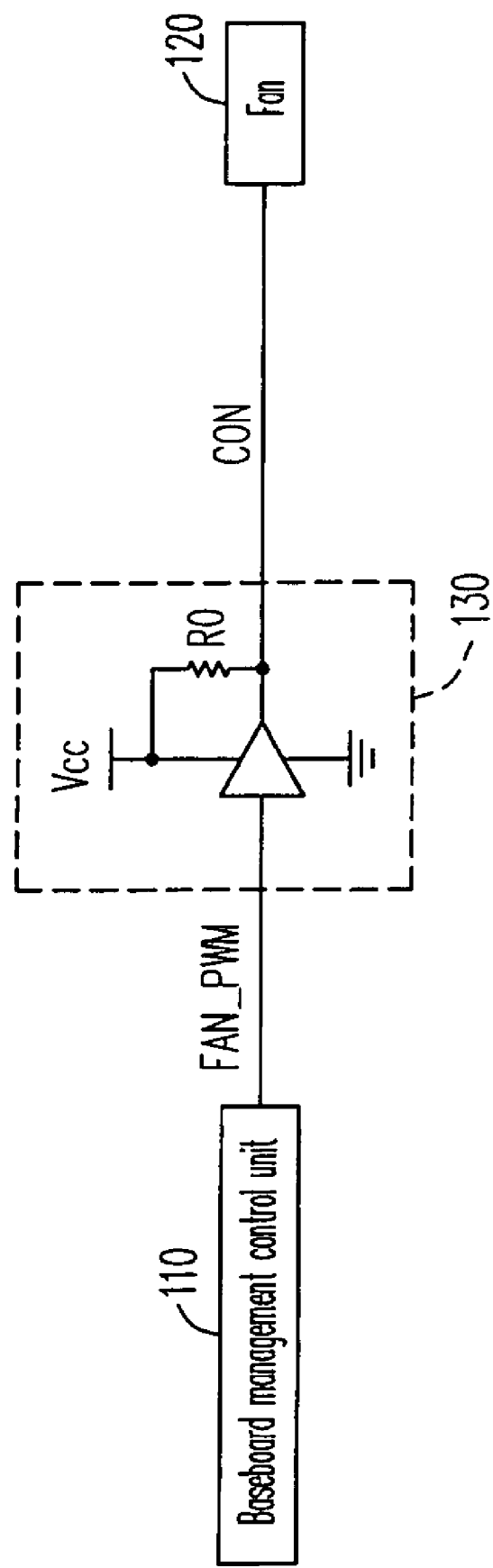
FIG. 1 illustrates a partial circuit diagram of a conventional fan speed control device.
Figure 2:
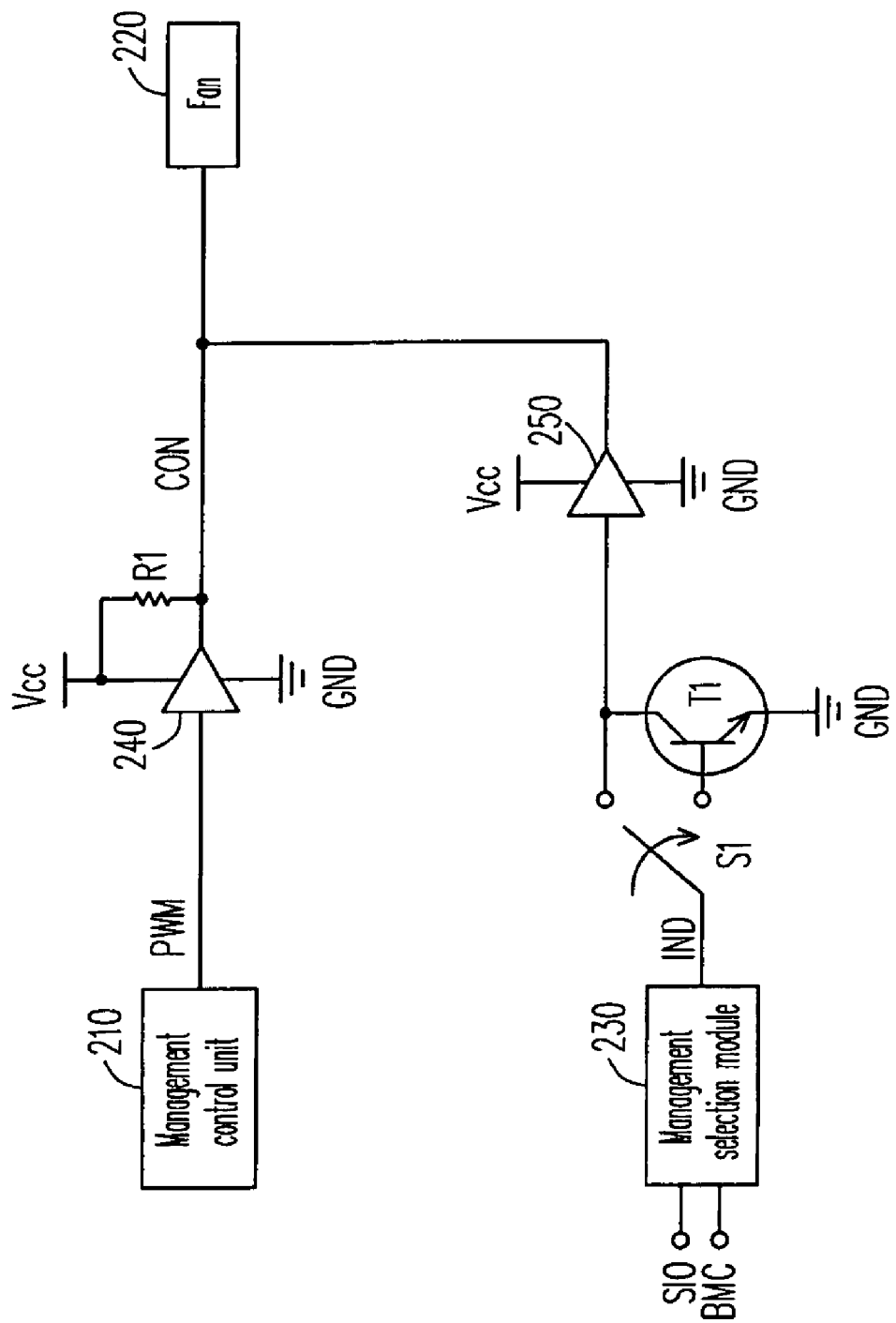
FIG. 2 illustrates a circuit diagram of a fan speed control device according to one embodiment of the present invention.

FIG. 2 illustrates a circuit diagram of a fan speed control device according to one embodiment of the present invention. Referring to FIG. 2, the fan speed control device 200 includes a management control unit 210, a management selection module 230, a first buffer 240, a second buffer 250, a resistor R1, a switch S1 and a transistor T1. It is assumed herein that the motherboard supports a system of a baseboard management control, and the management control unit 210 of this embodiment is a baseboard management control (BMC), i.e., the management control unit 210 generates a pulse width modulation signal PWM to control the speed of the fan 220, based on the received sensed information. In case the motherboard does not support the system of the baseboard management control, the management control unit 210 may be a general serial input and output (SIO) interface, i.e., the speed of the fan 220 is controlled by the serial input and output interface.

The management selection module 230 selectively outputs an indicative signal IND, which is indicative of a power-on status, of the serial input and output interface or the baseboard management control, according to whether the motherboard supports the system of the baseboard management control or not. The first buffer 240 has a first power source terminal and a second power source terminal coupled to a first voltage (e.g., power source voltage Vcc) and a second voltage (e.g., ground voltage GND), respectively. The first buffer 240 has an input terminal to receive the pulse width modulation signal PWM, and an output terminal to generate a control signal CON to the fan 220. The resistor R1 has a first end and a second end coupled to the first power source terminal and the output terminal of the first buffer 240, respectively.

The switch S1 is coupled to the management selection module 230. The switch S1 determines to transmit the indicative signal IND to a control terminal of the transistor T1 or to a first terminal of the transistor T1 according to the logic level of the indicative signal IND. The transistor T1 has a second terminal coupled to the second voltage. The second buffer 250 has a first power source terminal and a second power source terminal coupled to the first voltage and the second voltage, respectively, and the second buffer 250 has an input terminal and an output terminal coupled to the first terminal of the transistor T1 and the output terminal of the first buffer 240, respectively.

In the illustrated embodiment, the first buffer 240 and the second buffer 250 are buffers in the integrated circuit (IC) with a product number of 74LCX07, for example. This integrated circuit includes six buffers therein. If the input terminals of the buffers receive a signal having a logic high level, the output terminals of the buffers will generate a high impedance signal. If the input terminals of the buffers receive a signal having a logic low level, the output terminals of the buffers will generate a signal having logic low level. In general, the integrated circuit with the buffers has been utilized in the motherboard, and this embodiment fully utilizes the buffers of the integrated circuit to design the circuit for controlling the fan to operate at its minimum speed at the power-on moment of the computer.

In the illustrated embodiment, that the motherboard may support a different systems has been fully considered. If the motherboard supports the system of the baseboard management control, then the indicative signal of the baseboard management control is usually enabled as one of a logic high level and a logic low level. However, in case the motherboard does not support the system of the baseboard management control, the logic level of the indicative signal of the serial input and output interface is uncertain. Therefore, at the power-on moment, this embodiment is discussed in terms of the indicative signal having a logic high level and the indicative signal having a logic low level.

If the indicative signal IND has a logic high level "1" at the power-on moment, the switch S1 will transmit the indicative signal IND to the control terminal of the transistor T1, which is a NPN bipolar junction transistor (BJT), causing the transistor T1 to be conducted. Because the transistor T1 is conducted, the voltage signal of the first terminal of the transistor T1 is pulled down to the ground voltage GND which is seen as a logic low level "0", and is transmitted to the fan 220 through the second buffer 250. If the voltage signal of the first terminal of the transistor T1 keeps the logic low level at power-on moment, the fan 220 can be controlled to operate at its minimum speed.

If the indicative signal IND has the logic low level "0" at the power-on moment, the switch S1 will transmit the indicative signal IND to the first terminal of the transistor T1. In this case, the voltage signal of the first terminal of the transistor T1 has the low logic level, and is therefore transmitted to the fan 220 through the second buffer 250 to control the fan 220 to operate at its minimum speed.

It should be noted that, at the power-on moment, although the output terminal of the first buffer 240 may provide the control signal CON having a logic high level (i.e., power source voltage Vcc) to the fan 220, the output terminal of the buffer 250 has a higher driving capacity than the output terminal of the first buffer 240 and thus can control the fan 220 to operate at its minimum speed.

As the system enters stable operation, the management control unit 210 is already able to provide the pulse width modulation signal PWM to the output terminal of the first buffer 240, and generate the control signal CON to the fan 220 via the first buffer 240. In this case, the driving capacity of the output terminal of the first buffer 240 is higher than the power source voltage Vcc coupled to the output terminal of the first buffer 240, and the signal of the output terminal of the second buffer 250. As a result, the speed of the fan 220 can be varied by the duty cycle of the pulse width modulation signal PWM.

Figure 3:
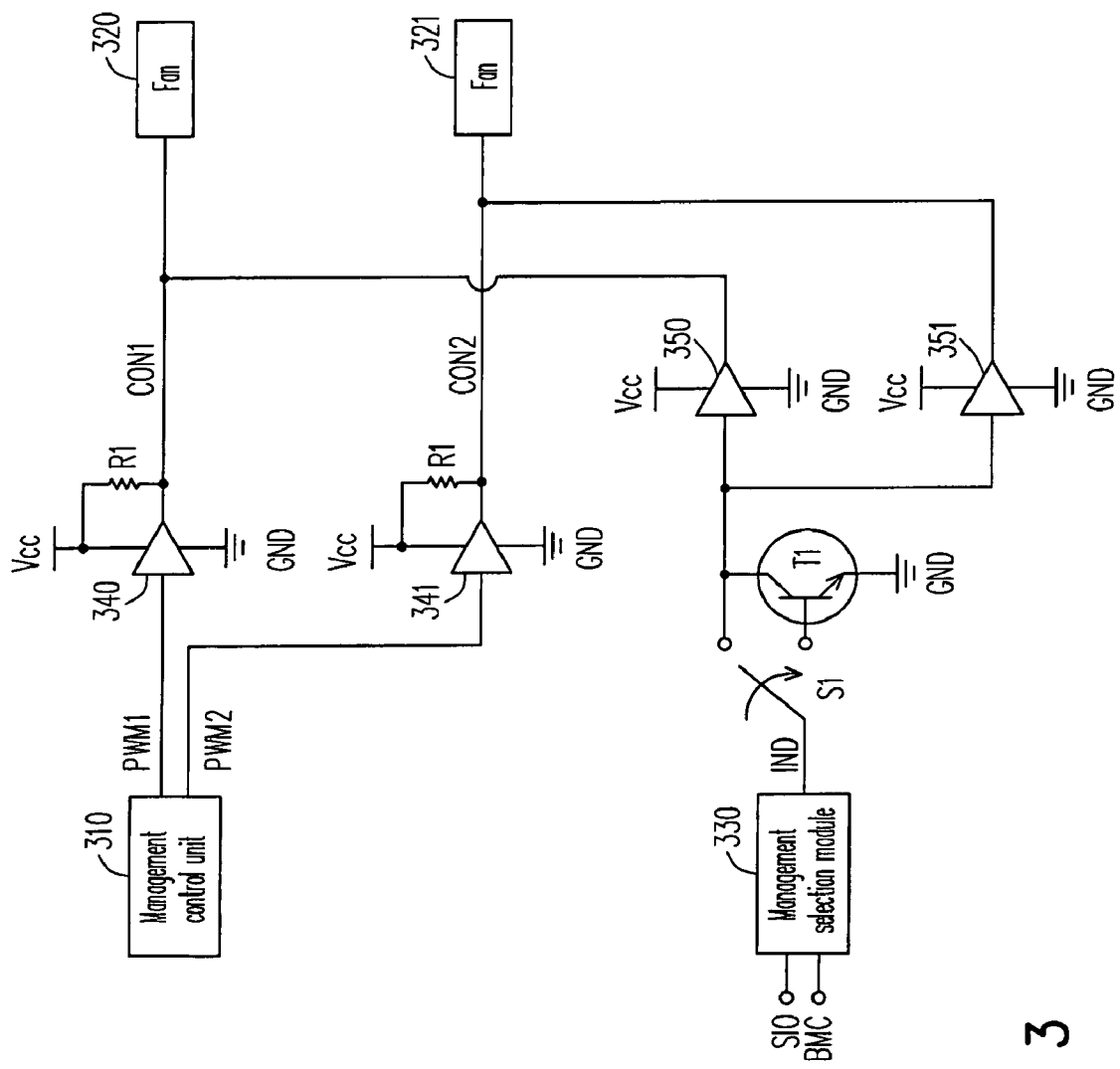
FIG. 3 illustrates a fan speed control device according to another embodiment of the present invention.

FIG. 3 illustrates a fan speed control device according to another embodiment of the present invention. In this embodiment, considering that multiple fans may be disposed within the chassis, another fan speed control device is further included. Referring to FIGS. 2 and 3, the difference between the embodiment illustrated in FIG. 3 and the embodiment illustrated in FIG. 2 is that the embodiment illustrate in FIG. 3 further includes a first buffer 341 and a second buffer 342 to control a fan 321. The first buffer 341 has an input terminal to receive a pulse width modulation signal PWM2 transmitted from a management control unit 310, and an output terminal to generate a control signal CON2 to the fan 321. The second buffer 351 has an input terminal and an output terminal coupled to the first terminal of the transistor T1 and the output terminal of the first buffer 341, respectively. At the power-on moment, by the operation of the switch S1 similar to the embodiment as illustrated in FIG. 2, the second buffer 351 generates a signal having a logic low level at its output terminal to control the fan 321 to operate at its minimum speed. As the system enters stable operation, the speed of the fan 321 is controlled by the pulse width modulation signal PWM2 via the first buffer 341.

In summary, that the motherboard may support a different system has been fully considered in the above-described embodiments. If the motherboard supports the system of the baseboard management control system, then the fan speed is controlled by the base board management control. Otherwise, the fan speed is controlled by the general serial input and output interface. In addition, since the logic level of the indicative signal of the serial input and output interface is uncertain at the power-on moment, the switch is operated according to the logic level of the indicative signal in order to ensure the first terminal of the transistor has the low logic level at the power-on moment, such that the fan is controlled to operate at its minimum speed via the second buffer. In this way, the conventional system crash problem, which is caused by the output power shortage of the power supply due to the full speed operation of the fans at the power-on moment, can be avoided. The conventional noise problem caused by the fans can also be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fan speed control device adapted for controlling a speed of a fan, comprising:
    a management selection module, selectively outputting an indicative signal of a serial input and output interface or an indicative signal of a baseboard management control, according to whether a motherboard supports a system of the baseboard management control or not, wherein the indicative signal is indicative of a power-on status;
    a first buffer, having a first power source terminal coupled to a first voltage, a second power source terminal coupled to a second voltage, an input terminal receiving a pulse width modulation signal and an output terminal generating a control signal to the fan;
    a resistor, having a first end coupled to the first power source terminal of the first buffer, and a second end coupled to the output terminal of the first buffer;
    a transistor, having a control terminal, a first terminal, and a second terminal coupled to the second voltage;
    a switch, coupled to the management selection module and determining to transmit the indicative signal to the control terminal of the transistor or the first terminal of the transistor according to a logic level of the indicative signal; and
    a second buffer, having a first power source terminal coupled to the first voltage, a second power source terminal coupled to the second voltage, an input terminal coupled to the first terminal of the transistor, and an output terminal coupled to the output terminal of the first buffer.

2. The fan speed control device as claimed in claim 1, wherein the management selection module outputs the indicative signal of the serial input and output interface if the motherboard does not support the system of the baseboard management control, and the management selection module outputs the indicative signal of the baseboard management control if the motherboard supports the system of the baseboard management control.

3. The fan speed control device as claimed in claim 1, wherein the switch transmits the indicative signal to the control terminal of the transistor to conduct the transistor if the indicative signal has a high logic level, and the switch transmits the indicative signal to the first terminal of the transistor if the indicative signal has a low logic level.

4. The fan speed control device as claimed in claim 1, further comprising:
    a management control unit, transmitting the pulse width modulation signal, wherein the management control unit is one of the serial input and output interface and the baseboard management control.

5. The fan speed control device as claimed in claim 1, wherein the first voltage is a power source voltage and the second voltage is a ground voltage.

* * * * *